United States Patent Office 3,639,309
Patented Feb. 1, 1972

3,639,309
SPRAY STARCH CONTAINING WATER-SOLUBLE POLYURETHANE
Jesse H. Starkman, Deerfield, and William J. Brown, Chicago, Ill., assignors to Starkman Associates, Inc., Deerfield, Ill.
No Drawing. Filed Mar. 19, 1969, Ser. No. 808,686
Int. Cl. C08g 41/04
U.S. Cl. 260—9
5 Claims

ABSTRACT OF THE DISCLOSURE

An improved spray starch formulation is prepared by incorporating at least about 30% of a film-forming, water-soluble polyurethane, based on the weight of the dry starch. At this level, the polyurethane addition produces increased ironing ease, improved scorch resistance, and improved soil release properties.

---

The present invention relates to an improved, sprayable starch composition, and more specifically to an improved starch composition containing film-forming, water-soluble polyurethane.

Starch compositions that can be sprayed from an aerosol can or from a pump spray bottle are a great convenience to the housewife, and have become a commercially important item. A persistent difficulty with these compositions, however, has been the production of excessive sticking during ironing, together with a tendency to entrap soil.

Generally, the present invention relates to improved starch compositions which, in the broad sense, comprise a solution of starch, a solvent, and at least about 30% of a film-forming, water-soluble polyurethane based on the weight of the starch.

More specifically, it has now been found that improved properties may be imparted to sprayable starch compositions by incorporating a film-forming, water-soluble polyurethane therein and in an amount of at least about 30%, based upon the weight of the starch. The upper limit on the amount of water-soluble polyurethane employed is dictated primarily by economics, and by the need to avoid clogging of the spray nozzle used to apply it to the fabric. When an aerosol spray is used, the water-soluble polyurethane should not exceed about 5% of the total mixture, corresponding to a maximum of about 500% of the weight of the starch. If a pump spray is employed, the water-soluble polyurethane may be present in amounts as high as 10% of the overall mixture (a maximum of 1000%, starch basis) without adversely affecting its sprayability. However, at such high levels, the advantages produced by the increased amount of water-soluble polyurethane are not in proportion to the increased expense. The weight of the starch is taken in its dry state, before the addition to the solvent. In most cases, and in the preferred embodiment, the solvent will be water.

Numerous advantageous characteristics are contributed to the starch composition by the use of a water-soluble polyurethane additive. These include increased ironing ease (reduced friction), the imparting of soil-release properties to the fabric, and resistance to scorching. If these advantages are to be achieved, it is critical, however, that the water-soluble polyurethane be present in the required amount, i.e., at least about 30% based on the weight of the starch. In the preferred embodiment, the compositions made in accordance with the present invention incorporate from about 1% to about 5% starch, based on the overall weight of the composition, and in the most preferred embodiment about 3% to 4% starch is employed.

As used herein, the term "starch" refers to both chemically unmodified and modified starches normally employed as laundry starches. Exemplary chemically unmodified starches are those derived from corn, potatoes, tapioca, sago, wheat, rice, and sweet potatoes. The term "starch" also includes carbohydrate starch derivatives that do not react with cellulose or with water-soluble polyurethane. Examples include hydrolyzed starch, chlorinated starch, starch esters such as starch phosphate, and starch ethers such as starch methyl ether. However, as used herein, the term "starch" does not include reactive starch derivatives, such as starch dialdehyde, that react with cellulose and/or with polyurethane. All of the starches and polyurethanes employed in accordance with the present invention must be water-soluble. As used herein, the term "water soluble" means soluble at levels at least as high as 5%, and generally substantially higher. By the term "film-forming" it is meant that the polyurethane employed can be cast into a film which melts above room temperature, but preferably below about 150° C. and most preferably below about 100° C. Preferred polyurethanes are those having film extensibility of greater than 5% and more preferably 10% to 25% or more, and a breaking tensile strength, as a 0.005-inch film of at least 100 lbs. per square inch and preferably 1000 lbs. per square inch or more. Such polyurethanes usually produce viscosities, as a 25% aqueous solution at 25° C., of from about 1000 centipoises to about 2000 to 10,000 centipoises, or even higher. Those producing viscosities of at least about 10,000 centipoises are preferred.

Virtually any film-forming, water-soluble polyurethane may be used in accordance with the present invention, irrespective of the precise identity of the diisocyanate and the polymerizing agent. Of course, it is essential that the polyurethane be one that does not react with starches of the type recited above, and also one that does not react with fabric components such as cellulose. A detailed discussion of suitable water-soluble polyurethanes will be found in U.S. Pat. No. 3,086,887 to Habib, issued Apr. 23, 1968. Preferred polyurethanes for use in accordance with the present invention are polyethyleneoxy polyurethanes, which contain ethyleneoxy polymeric units between the diisocyanate groups. Such ethyleneoxy polymeric units are defined by the general formula:

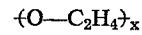

wherein $x$ is an integer from about 15 to about 10,000 or even higher. Preferably, $x$ will be an integer between about 45 and 225, and, in the most preferred embodiment, between about 100 and 160.

A wide variety of diisocyanates may be used in the preparation of polyurethanes employed in the compositions of the present invention. Aryl, and especially monophenyl, diisocyanates are preferred. Suitable diisocyanates include tolylene - 2,4 - diisocyanate; tolylene-2,6 diisocyanates; m-phenylene diisocyanate, 2,2' - dinitrodiphenylene-4,4'-diisocyanate, cyclohexylphenylene - 4,4'-diisocyanate, hexamethylene diisocyanate, diphenylene - 4,4' - diisocyanate, diphenylmethane - 4,4' - diisocyanate, di-para-xylylmethane-4,4'-diisocyanate, naphthalene-1,4-diisocyanate and the corresponding 1,5 and 2,7 isomers thereof, chlorophenylene-2,4-diisocyanate, and decyclohexylmethane-4,4'.

Water-soluble polyurethanes suitable for use in accordance with the present invention are available commercially, and are prepared according to procedures which are well known to those skilled in the art. The precise chemical identity of the polyurethane employed is not nearly so important as its physical properties. That is, it must be water-soluble and capable of forming a film.

The following example is intended to illustrate the present invention, and should not be construed as limitative, the scope of the invention being determined by the appended claims.

A starch formulation was compounded in accordance with the following formulation:

| Component: | Percent by weight |
|---|---|
| Starch | 3.00 |
| Silicone (dimethyl polysiloxane) | 0.50 |
| Preservative | 0.03 |
| Antifoam agent | 0.05 |
| Water-soluble polyurethane | 1.50 |
| Water | 89.92 |
| Propellant | 5.00 |

The above mixture was sprayed onto cotton fabric prior to ironing, and was found to produce excellent ironing ease, together with resistance to scorching. Upon laundering, it was found that this composition imparted outstanding soil release properties. As a basis of comparison, a similar composition was prepared in which the water-soluble polyurethane was omitted. A qualitative test showed that substantially increased effort was required in order to move an iron across the fabric, and a scorch test showed scorching at an earlier stage than was produced when the spray starch included the water-soluble polyurethane.

Obviously, many modifications and variations of the invention as hereinbefore set forth may be made without departing from the spirit and scope thereof, and it is intended to cover in the appended claims all such modifications and variations as fall within the true spirit and scope of the invention.

We claim:
1. A sprayable starch composition comprising: laundry starch, water, and about 30–1000% of a film-forming, water-soluble polyurethane, based on the weight of said starch, said water being present in an amount sufficient to render said composition sprayable.

2. A starch composition as defined in claim 1 wherein said starch is present in an amount from about 1% to about 5% based on the weight of said composition.

3. The starch composition as defined in claim 1, further including a dimethyl polysiloxane.

4. A sprayable starch composition comprising: about 3%–4% laundry starch, based upon the total weight of said composition; water; and a film-forming, water-soluble polyurethane, said polyurethane being present in an amount of at least about 30%, based on the weight of said starch, and said polyurethane being present in amounts of up to about 10% of the total weight of said starch composition, and said water being present in an amount sufficient to render said composition sprayable.

5. A starch composition as defined in claim 4 further including a minor amount of a dimethyl polysiloxane.

References Cited

UNITED STATES PATENTS

| | | |
|---|---|---|
| 3,086,887 | 4/1968 | Habib. |
| 3,462,384 | 8/1969 | Kokoszka et al. _____ 260—9 |

WILLIAM H. SHORT, Primary Examiner

E. WOODBERRY, Assistant Examiner

U.S. Cl. X.R.

117—139.5 C; 252—8.6